United States Patent [19]
Caporuscio et al.

[11] Patent Number: 5,939,998
[45] Date of Patent: Aug. 17, 1999

[54] SYSTEM AND METHOD FOR REDUCING QUIESCENT CURRENT IN A MICROCONTROLLER

[75] Inventors: Pier T. Caporuscio, Armada; Steven R. Settles, Sterling Heights, both of Mich.

[73] Assignee: UT Automotive Dearborn, Inc., Dearborn, Mich.

[21] Appl. No.: 08/572,767

[22] Filed: Dec. 15, 1995

[51] Int. Cl.[6] ............... G06F 1/00; G06F 11/34; G04B 47/00

[52] U.S. Cl. ............... 340/825.08; 340/825.09; 340/825.78; 340/636; 307/28; 307/116; 307/125; 363/74; 363/75; 395/707; 395/750; 364/424.03; 364/424.034

[58] Field of Search ............... 340/825.08, 825.78, 340/825.09, 636; 307/28, 31, 116, 125, 10.7, 10.8, 126; 363/74, 75; 364/424.03, 424.04, 424.034, 431.11, 707; 320/1, 5, 21, 48

[56] References Cited

U.S. PATENT DOCUMENTS

| | | | |
|---|---|---|---|
| 4,734,871 | 3/1988 | Tsunoda et al. | 364/557 |
| 4,847,614 | 7/1989 | Keller | 340/825.56 |
| 4,987,317 | 1/1991 | Pournaint et al. | 307/40 |
| 5,109,221 | 4/1992 | Lambropoulos et al. | 340/825.69 |
| 5,115,236 | 5/1992 | Kohler | 340/825.69 |
| 5,239,520 | 8/1993 | Arnold | 368/10 |
| 5,475,654 | 12/1995 | Furumura et al. | 368/10 |
| 5,485,625 | 1/1996 | Gumkowski | 395/800 |
| 5,569,965 | 10/1996 | Tsunehiro | 307/10.1 |

FOREIGN PATENT DOCUMENTS 4123811  1/1993  Germany.

OTHER PUBLICATIONS

Mitsumi ICs The Best Way to Protect a Microprocessor, no date author.

*Primary Examiner*—Michael Horabik
*Assistant Examiner*—Yonel Beaulieu
*Attorney, Agent, or Firm*—Ozer M. N. Teitelbaum

[57] ABSTRACT

A system having reduced quiescent current drawn from a power supply. The system includes a device having a status. Moreover, the system includes a microcontroller, having an active and a sleep mode of operation, for polling the status of the device during the active mode, initiating a function in response to a change in the status during the active mode, and for conserving quiescent current drawn from the power supply during the sleep mode. The microcontroller generates an output signal at a first voltage level during the active mode and generates the output signal at a second voltage level during the sleep mode. The microcontroller, additionally, includes a sensor for switching the microcontroller from the sleep mode to the active mode. Furthermore system includes a storage device for charging to the first voltage level during the active mode, and for discharging to a third voltage level during the sleep mode for triggering the sensor to switch from the sleep mode to the active mode.

19 Claims, 2 Drawing Sheets

5,939,998

SYSTEM AND METHOD FOR REDUCING QUIESCENT CURRENT IN A MICROCONTROLLER

FIELD THE INVENTION

This invention relates generally to automotive electronic circuits, and more particularly, to a system and method for reducing quiescent current in a microcontroller.

BACKGROUND OF THE INVENTION

Power consumption is an important issue in battery powered electronic circuits, generally. In the automotive industry, a great emphasis has been placed on extending the life span of batteries. This issue, when taken in combination with the increasing number of electrical and electronic content and complexity within present automobiles, presents a unique dilemma.

A solution for simplifying the management of this electrical and electronic content which has gained increasing acceptance within the automotive industry has been multiplexing. Multiplexing proposes to electrically couple each electrical and electronic device through a singular loop interface with a microcontroller.

Managing each electrical and electronic device constantly is wasteful and inefficient. Thus, in attempting to balance the interests of power savings against the benefits of multiplexing, one solution proposed has been to allow the microcontroller to operate in a sleep mode of operation during all times when the microcontroller processing capabilities are not required.

Referring to FIG. 1, a multiplexed control system 10 is illustrated having reduced power consumption. System 10 comprises a microcontroller 20 for controlling first and second electronic devices 24 and 28, respectively, by way of first and second control switches 12 and 14. Control switches 12 and 14 are coupled to one another, and through a singular loop, also coupled with microcontroller 20.

To effectively realize a multiplexed architecture, first and second devices 24 and 28 are also coupled to each other, and through a singular line, coupled with microcontroller 20 as well as ground. By this configuration, microcontroller 20 processes effective changes in the status of each switch by feeding a device control signal through the multiplexed input loop.

System 10 additionally comprises one diode for each switch. First and a second diode, $D_1$ and $D_2$, provide a means for detecting a change in the status of each respective control switch, 12 and 14. Diodes, $D_1$ and $D_2$, are each coupled with the interrupt sensor of microcontroller 20. By this design, each diode independently enables microcontroller 20 to effectively wake up from a low power sleep mode when it is not required to a fully powered active mode when its processing capabilities are required.

System 10 of the FIG. 1 poses a substantial shortcoming. In automobiles having a greater number of electrically powered devices, a diode is required for each device to enable the microcontroller to switch from sleep mode to active mode. Further, in manufacturing a large number of systems, this can be fairly costly.

Thus, a demand exists for a multiplexed system having a power consumption savings that is substantially more cost effective than the known art.

SUMMARY OF THE INVENTION

The primary advantage of the present invention is to overcome the limitations of the prior art.

Another advantage of the present invention is to provide a system that reduces quiescent current drawn from a power supply.

A further advantage of the present invention is to provide for a system that reduces quiescent current drawn that is substantially less costly to manufacture.

In order to achieve the advantages of the present invention, a system is disclosed for a system having reduced quiescent current drawn from a power supply. The system comprises a device having a status. Moreover, the system comprises a microcontroller, having active and sleep modes of operation, for polling the status of the device during the active mode, initiating a function in response to a change in the status during the active mode, and for conserving quiescent current drawn from the power supply during the sleep mode. According to the present invention, the microcontroller generates an output signal at a first voltage level during the active mode and generates the output signal at a second voltage level during the sleep mode. The microcontroller, additionally, comprises a sensor for switching the microcontroller from the sleep mode to the active mode. Furthermore system comprises a storage device for charging to the first voltage level during the active mode, and for discharging to a third voltage level during the sleep mode for triggering the sensor to switch from the sleep mode to the active mode.

These and other advantages and objects will become apparent to those skilled in the art from the following detailed description read in conjunction with the appended claims and the drawings attached hereto.

BRIEF DESCRIPTION OF THE DRAWINGS

The present invention will be better understood from reading the following description of non-limitative embodiments, with reference to the attached drawings, wherein below.

It should be emphasized that the drawings of the present disclosure are not to scale but are merely schematic representations and are not intended to portray the specific parameters or the structural details of the invention, which can be determined by one of skill in the art by examination of the information herein.

DETAILED DESCRIPTION OF THE PREFERRED EMBODIMENTS

Figure 1:
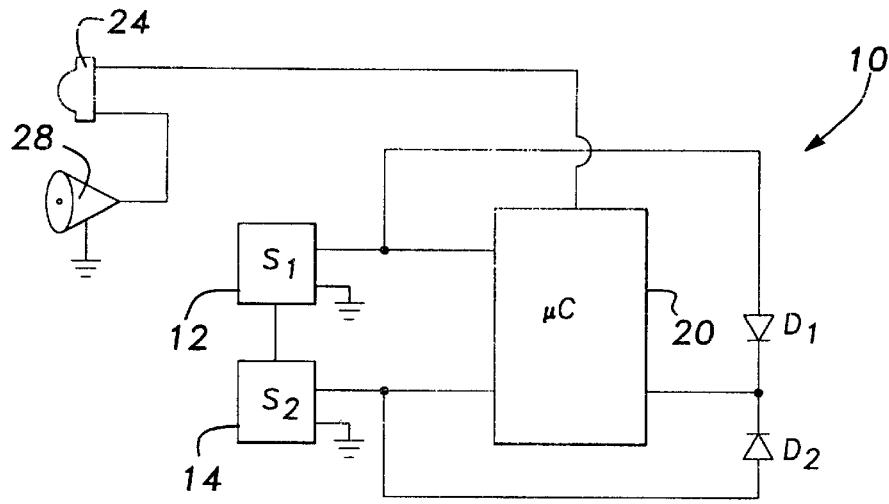
FIG. 1 illustrates a circuit realization according to the known art.
Figure 2A:
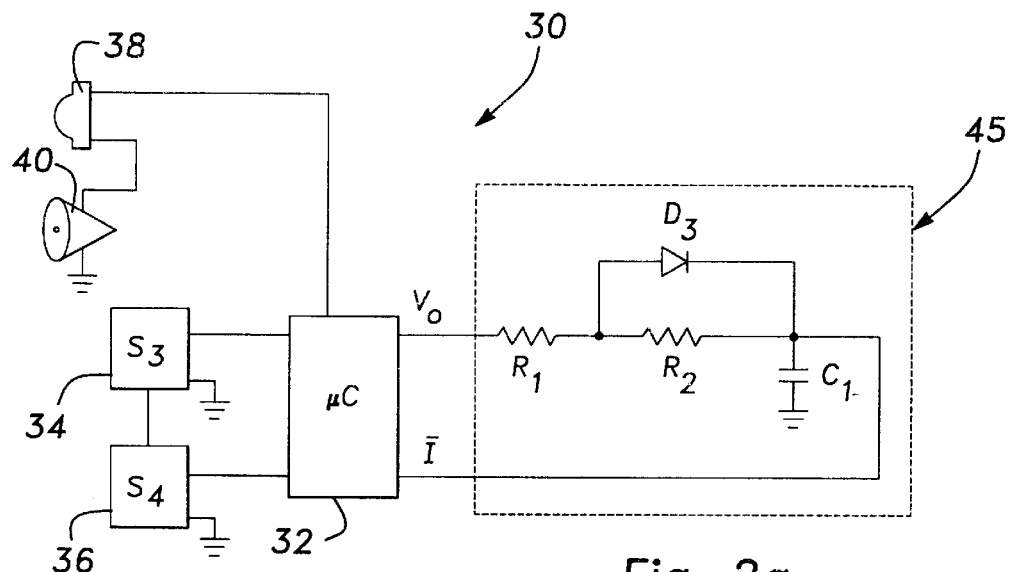
FIGS. 2(a) and 2(b) respectively illustrate a circuit realization and a graphical representation of the current drawn according to the preferred embodiment of the present invention.

Referring to FIG. 2(a), a multiplexed control system 30 is illustrated having reduced quiescent current drawn from a power supply. System 30 comprises a microcontroller 32 for controlling first and second electronic devices 38 and 40, respectively, by way of first and second control switches 34 and 36. In the preferred embodiment of the present invention, multiplexed control system 30 is employed in an automobile, such that first and second devices are automotive accessories and/or components, such as a headlamp or horn.

First control switch 34 enables and disables first device 38 through microcontroller 32. Likewise, through microcontroller 32, second control switch 36 enables and disables second device 40. Control switches 32 and 34 are coupled to one another, and through a singular loop are also coupled with microcontroller 32. To effectively realize a multiplexed architecture, first and second devices 38 and 40 are also coupled to each other, and, through a singular line, coupled with microcontroller 32 as well as ground. By this configuration, microcontroller 32 processes effective changes in the status of each switch by feeding a device control signal through the multiplexed input loop.

System 30 reduces quiescent current drawn from a power supply (not shown) in a cost effective manner by utilizing circuitry 45. Microcontroller 32 comprises an active mode of operation to perform system functions including initiating changes to devices 38 and 40 through a device control signal, and a sleep mode of operation to reduce the quiescent current drawn. In active mode, microcontroller 32 polls the status of each of the control switches 34 and 36 at an initial time to determine whether to enable and/or disable devices 38 and 40. To insure the accuracy of this polling step, microcontroller 32 repolls switches 34 and 36 at least once more before effectively enabling and/or disabling devices 38 and 40. As each switch comprises a debounce time period, microcontroller 32 performs this repolling of switches 34 and 36 at a second time. This second time corresponds with the passage of the longer debounce period of both debounce time periods to secure against falsely triggering or disabling devices 38 and 40.

To effectively conserve quiescent current, system 30 enables a mechanism to efficiently change the operation of microcontroller 32 from sleep to active mode by means of circuitry 45. Circuitry 45 comprises a loop between a voltage output $V_0$ and an interrupt input $\bar{I}$ of microcontroller 32. The circuit loop comprises an input resistor $R_1$ coupled in series with a second resistor $R_2$. Coupled in parallel with second resistor $R_2$, at a first and second node, is one diode $D_3$. Further attached at the second node coupling diode $D_3$ and resistor $R_2$ is a capacitor $C_1$ running to ground. The circuit loop is completed by coupling the second node also to the interrupt input.

The components of circuitry 45 enable a quick charging and a slow discharging of capacitor $C_1$ to effectively minimize the quiescent current drawn and reduce the amount of the false triggering of the interrupt sensor. These objective may be realized by selecting a value for resistor $R_2$ that is substantially larger than resistor $R_1$. In one embodiment, resistor $R_2$ is equal to 10,000 ohms while resistor $R_1$ is equal to 100 ohms. Furthermore, diode $D_3$ functionally shortens the charging time of capacitor $C_1$. When capacitor $C_1$ is charging to the first voltage level of voltage output $V_0$, the charging time constant, $\tau_c$, is equal to the inverse of the product of the value of capacitor $C_1$ and the value of the resistor $R_1$. This can be understood simply by the fact that when capacitor $C_1$ is charging, the current flowing through the circuit loop passes through diode $D_3$ and not resistor $R_2$. In contrast, when the capacitor is discharging from the first voltage level of voltage output $V_0$, diode $D_3$ is off and the current flowing through the circuit loop passes through resistor $R_2$ and not diode $D_3$. By this arrangement, the discharging time constant, $\tau_d$, is equal to the inverse of the product of the value of capacitor $C_1$ and the value of the sum of resistors $R_1$ and $R_2$.

Figure 2B:
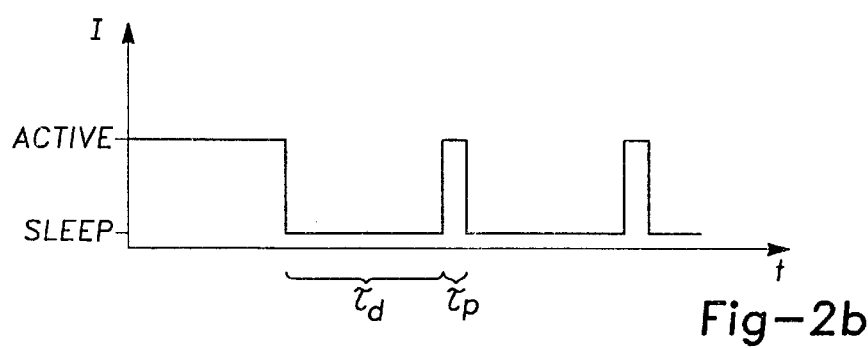

Referring to FIG. 2(b), a graphical representation of the current drawn by system 30 is illustrated. As shown, while in the active mode, microcontroller draws a first level of current to functionally operate. Once microcontroller 32 switches to sleep mode, however, the current drawn drops to a quiescent level for the time period $\tau_d$. The current drawn again rises, with the passage of the time period $\tau_d$, as microcontroller 32 switches to the active mode and polls the status of control switches 34 and 36 for a polling time period $\tau_p$. Polling time period $\tau_p$ is dependant on the number of switches employed and the time it takes microcontroller 32 to poll each switch. To effectively reduce usage of quiescent current, $\tau_p$ must be smaller than $\tau_d$. By doing so, microcontroller primarily operates in sleep mode to minimize drawing active mode current. Thus, $\tau_d$ is less than or equal to twice the shortest debounce period, while also being greater than or equal to polling time period $\tau_p$.

Figure 3:
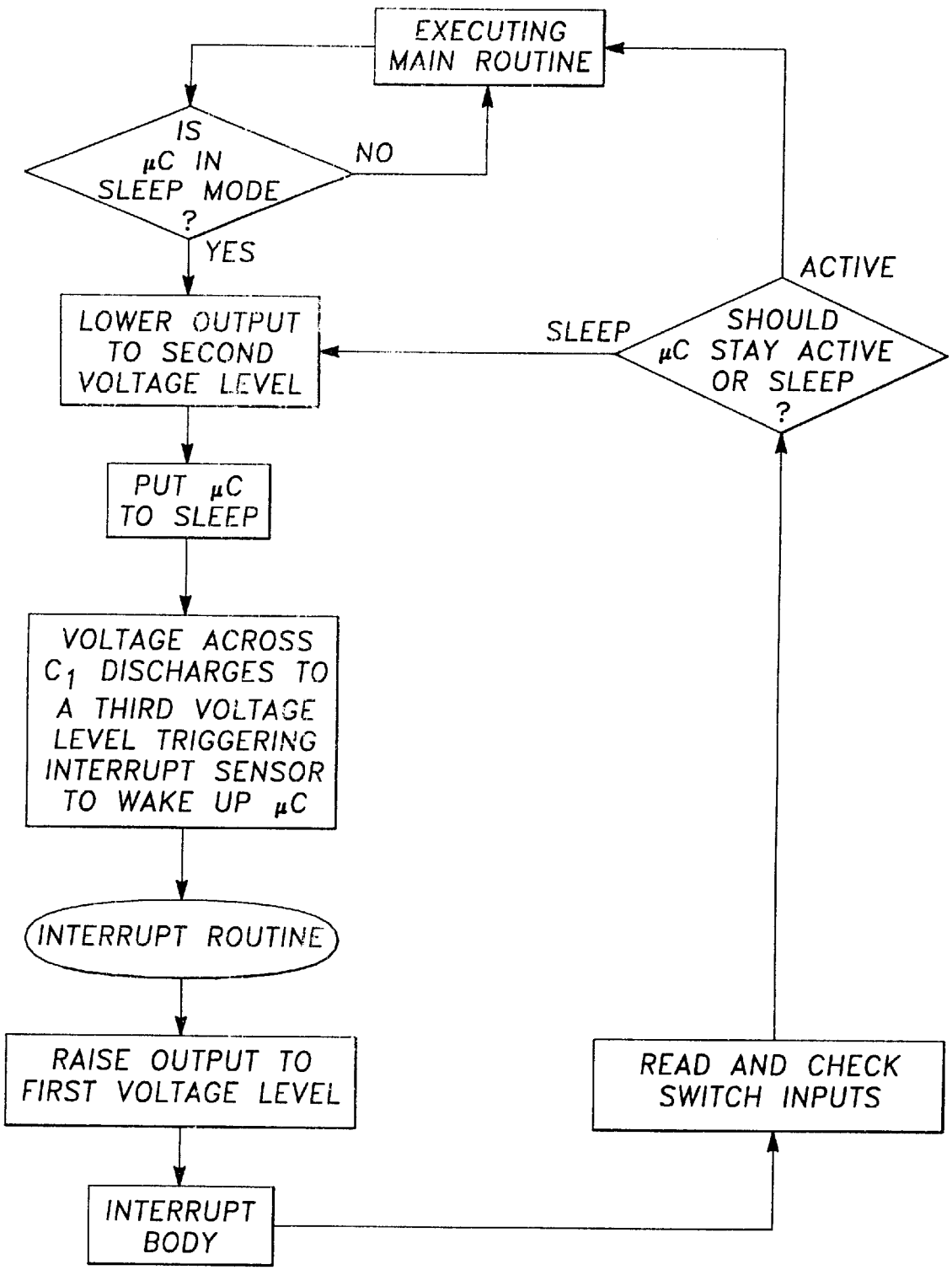
FIG. 3 illustrates a flow chart of the steps employed according to the present invention.

Referring to FIG. 3, a flow chart is illustrated depicting the operational steps employed by system 30 generally, and microcontroller 32 specifically. In operation, with microcontroller 32 in an active mode, the voltage output $V_0$ is initially set at a logical high or 1, enabling capacitor $C_1$ to charge to the logical voltage high level. After the first polling, microcontroller 32 lowers the voltage output $V_0$ to a logic low or 0 and inherently goes into the sleep mode. As a result, the voltage across capacitor $C_1$ begins to discharge at a rate equivalent to the inverse product of the value of capacitor $C_1$ value and the value of the sum of resistors $R_1$ and $R_2$. Eventually, as capacitor $C_1$ discharges, the value of the voltage across capacitor $C_1$ drops to an intermediary voltage level, between the logical voltage high and logical voltage low, thereby triggering an interrupt sensor within microcontroller 32 though interrupt input $\bar{I}$. The interrupt sensor, once triggered, switches microcontroller 32 from the sleep mode to the active mode of operation, and begins to perform an imbedded interrupt routine.

Upon entering the interrupt routine, the voltage output $V_0$ is raised to a logical high or 1, capacitor $C_1$ begins charging up to the logical voltage high level, and microcontroller 32 polls the status of switches 34 and 36 and stores these results in memory. Subsequently, microcontroller 32 determines whether the longer debounce period of both debounce periods for switches 34 and 36, has passed. In the event the debounce period has not passed, microcontroller 32 lowers the voltage output $V_0$ to a logic low or 0 and switches into the sleep mode. If, however, the debounce period has passed, microcontroller 32 executes any status changes in switches 34 and 36 stored in memory by executing the main routine.

While the particular invention has been described with reference to illustrative embodiments, this description is not meant to be construed in a limiting sense. It is understood that although the present invention has been described in a preferred embodiment, various modifications of the illustrative embodiments, as well as additional embodiments of the invention, will be apparent to persons skilled in the art upon reference to this description without departing from the spirit of the invention, as recited in the claims appended hereto. Thus, while a capacitor is detailed in the hereinabove disclosure for charging and discharging, an equivalent component, such as an inductor, may be substituted by one of ordinary skill in the art, to achieve the same or similar functional purpose. It is therefore contemplated that the appended claims will cover any such modifications or embodiments as fall within the true scope of the invention.

All of the U.S. Patents cited herein are hereby incorporated by reference as if set forth in their entirety.

What is claimed is:

1. A control system having reduced quiescent current drawn from a power supply, said system comprising:
 a device having an operational status;
 a microcontroller, having an active mode and a sleep mode of operation, for polling said operational status of said device during said active mode, initiating a function in response to a change in said operational status during said active mode, and for conserving quiescent current drawn from the power supply during said sleep mode, said microcontroller generating an output signal at a first voltage level during said active mode and for generating said output signal at a second voltage level during said sleep mode, said microcontroller comprising a sensor for switching said microcontroller from said sleep mode to said active mode; and a storage device for charging to said first voltage level during said active mode, and for discharging to a third voltage level during said sleep mode for triggering said sensor to switch from said sleep mode to said active mode.

2. The control system of claim 1, wherein said storage device comprises a resistor and a capacitor.

3. The control system of claim 2, wherein said storage device further comprises a diode in parallel with said resistor.

4. The control system of claim 2, wherein said storage device charges faster than said storage device discharges.

5. The control system of claim 4, wherein said polling is performed during a polling time period, and said storage device discharges in a longer time period than said polling time period.

6. The control system of claim 2, wherein said device comprises a debounce period, and said microcontroller shifts to said sleep mode after said polling said status of said device at the beginning of said debounce period.

7. The control system of claim 2, wherein said device comprises a debounce period, and said microcontroller repolls said status of said device at the end of said debounce period.

8. The control system of claim 7, wherein said microcontroller shifts to said sleep mode after said repolling said status of said device at the end of said debounce period.

9. The control system of claim 2, wherein said device comprises a debounce period equal to or greater than one half of the inverse product of said capacitor and said resistor.

10. A multiplexed control circuit for controlling a first device and a second device having reduced quiescent current drawn from a power supply, said first and second devices being enabled and disabled by a first control switch and a second control switch, respectively, each of said switches having a operational status and a debounce period, said circuit comprising:

a microcontroller, having an active mode and a sleep mode of operation, for polling the operational status of the first control switch at the beginning of the debounce period of the first switch during said active mode, initiating the first device in response to a change in the operational status of the first control switch during said active mode, for polling the operational status of the second control switch at the beginning of the debounce period of the second switch during said active mode, initiating the second device in response to a change in the operational status of the second switch during said active mode, and for conserving quiescent current drawn from the power supply during said sleep mode, said microcontroller generating an output signal at a first voltage level during said active mode and for generating said output signal at a second voltage level during said sleep mode, said microcontroller comprising an interrupt sensor for switching said microcontroller from said sleep mode to said active mode; and an impedance for charging to said first voltage level during said active mode, and for discharging to a third voltage level during said sleep mode for triggering said interrupt sensor to switch from said sleep mode to said active mode.

11. The control circuit of claim 10, wherein said impedance comprises a resistor and a capacitor.

12. The control circuit of claim 11, wherein said storage device further comprises a diode in parallel with said resistor.

13. The control circuit of claim 10, wherein said impedance charges faster than said impedance discharges.

14. The control circuit of claim 13, wherein said polling of the first and second devices is performed during a polling time period, and said impedance discharges in a longer time period than said polling time period.

15. The control circuit of claim 10, said microcontroller shifts to said sleep mode after said polling said status of the first control switch at the beginning of the debounce period of the first control switch, and after said polling said status of the second control switch at the beginning of the debounce period of the second control switch.

16. The control circuit of claim 10, wherein said microcontroller repolls the status of the first control switch at the end of the debounce period of the first control switch, and repolls the status of the second control switch at the end of the debounce period of the second control switch.

17. The control circuit of claim 16, said microcontroller shifts to said sleep mode after said repelling the status of the first control switch at the end of the debounce period of the first control switch, and after said repolling the status of the second control switch at the end of the debounce period of the second control switch.

18. The control circuit of claim 11, wherein the shorter of the first and second debounce periods is equal to or greater than one half an inverse product of said capacitor and said resistor.

19. A method for reducing the quiescent current drawn from a power supply in a multiplexed control circuit for controlling a first device and a second device, each of the first and second devices having a status corresponding with being enabled and disabled by a first control switch and a second control switch, respectively, said method comprising the steps of:

executing a main routine on the control circuit and allowing an impedance to charge to a first voltage level of an output of the control circuit until the control circuit is determined to be in a sleep mode of operation;

conserving quiescent current drawn from the power supply during said sleep mode;

changing said first voltage level of said output of the control circuit operating in said sleep mode to a second voltage level;

enabling said impedance to discharge to a second voltage level to trigger an interrupt sensor on the control circuit and transfer the control circuit to a wake up mode of operation;

changing said second voltage level of said output of the control circuit operating in said wake up mode to said first voltage level;

polling the status of each of the switches for a polling time period, and returning the control circuit to said sleep mode after the passage of said polling time period; and initiating the first device in response to a change in the status of the polled first switch, and initiating the second device in response to a change in the status of the polled second switch.

\* \* \* \* \*